United States Patent
Noda

(10) Patent No.: US 7,050,186 B1
(45) Date of Patent: May 23, 2006

(54) PRINT CONTROL APPARATUS AND PRINT CONTROL METHOD CAPABLE OF CANCELING PRINT JOB

(75) Inventor: Akihiko Noda, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/557,913

(22) Filed: Apr. 21, 2000

(30) Foreign Application Priority Data

Apr. 27, 1999 (JP) ................................. 11-119633

(51) Int. Cl.
*G06F 15/00* (2006.01)
*G06F 17/60* (2006.01)

(52) U.S. Cl. ......................................... 358/1.15; 705/1

(58) Field of Classification Search .............. 358/1.15, 358/1.18, 442, 1.14, 402; 347/771, 772; 709/203, 209; 455/556.1; 379/211.01; 705/1, 705/2, 37

See application file for complete search history.

(56) References Cited

U.S. PATENT DOCUMENTS 5,800,073 A * 9/1998 Matsuda et al. .............. 400/74
6,449,055 B1 * 9/2002 Okimoto et al. ........... 358/1.15
6,600,569 B1  7/2003 Osada et al. ................ 358/1.12
6,633,395 B1  10/2003 Tuchitoi et al. ............ 358/1.14
6,639,687 B1 * 10/2003 Neilsen ..................... 358/1.14

FOREIGN PATENT DOCUMENTS

JP           9-114608         5/1997
JP          10-58788          3/1998

* cited by examiner

*Primary Examiner*—Kimberly Williams
*Assistant Examiner*—Saeid Ebrahimi
(74) *Attorney, Agent, or Firm*—Fitzpatrick, Cella, Harper & Scinto

(57) ABSTRACT

When canceling a print job in process of transfer, the user's load in accordance with a process for canceling the print job is reduced, and processes for actually deleting the print data in a printer and stopping a process for printing the print data are executed speedily. According to the present invention, the print data is received, it is analyzed whether or not predetermined information is included in the received print data, and the print job constructed by print data is canceled when the predetermined information is included as the analyzed result.

15 Claims, 20 Drawing Sheets

FIG. 9
| HOST  | | → | PRINTER 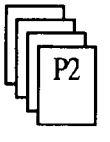 | |
|---|---|---|---|---|
| TRANSMITTING STANDBY DATA UNPROCESSED | TRANSMITTING STANDBY DATA IN PROCESS | DATA IN PROCESS OF TRANSMISSION | RECEIVED DATA (PRINTING STANDBY DATA) | DATA IN PROCESS OF PRINTING |
| (A) P1 | | | | |
| (B) P2 | P1 70% | | P1 30% | |
| (C) P5 | P4 60% | | P4 40% P3 P2 | P1 |
| (D) P5 | P4 20% | P4 40% | P4 40% P3 P2 | P1 |
| (E) P5 | P4 60% | DUMMY +C-FLAG 0% | P4 40% P3 P2 | P1 |

FIG. 10

| [JOB NAME] | [OWNER NAME] | [STATUS] | [SIZE] | [PROPERTY] |
|---|---|---|---|---|
| SAMPLE A | Mr – A | IN PROCESS OF PRINTING | XXKB | A3/ONE SIDE/NO STAPLE/... |
| TEST 1 | Mr – B | PRINTING STANDBY | XXKB | A4/ONE SIDE/NO STAPLE/... |
| DOCUMENT | Mr – C | PRINTING STANDBY | XXKB | A4/ONE SIDE/NO STAPLE/... |

CANCEL

FIG. 11

IN CASE OF CANCELING PRINTING,
CLICK CANCEL BUTTON

CANCEL

FIG. 12

PRINT JOB INFORMATION TABLE (A)

| No. | JOB NAME | OWNER NAME | TRANSMITTING STANDBY DATA UNPROCESSED | TRANSMITTING STANDBY DATA IN PROCESS | STATUS | CANCEL | TRANSMITTED DATA |
|---|---|---|---|---|---|---|---|
| 1 | SAMPLE A | Mr - B | P1, P2, ..... P5 | - | TRANSMITTING STANDBY | - | - |

PRINT JOB INFORMATION TABLE (B)

| No. | JOB NAME | OWNER NAME | TRANSMITTING STANDBY DATA UNPROCESSED | TRANSMITTING STANDBY DATA IN PROCESS | STATUS | CANCEL | TRANSMITTED DATA |
|---|---|---|---|---|---|---|---|
| 1 | SAMPLE A | Mr - B | P2, ..... P5 | 70% P1 | IN PROCESS OF TRANSMISSION | - | - |

PRINT JOB INFORMATION TABLE (C)

| No. | JOB NAME | OWNER NAME | TRANSMITTING STANDBY DATA UNPROCESSED | TRANSMITTING STANDBY DATA IN PROCESS | STATUS | CANCEL | TRANSMITTED DATA |
|---|---|---|---|---|---|---|---|
| 1 | SAMPLE A | Mr - B | P5 | 60% P4 | IN PROCESS OF TRANSMISSION | - | P1, P2, P3 |

PRINT JOB INFORMATION TABLE (D)

| No. | JOB NAME | OWNER NAME | TRANSMITTING STANDBY DATA UNPROCESSED | TRANSMITTING STANDBY DATA IN PROCESS | STATUS | CANCEL | TRANSMITTED DATA |
|---|---|---|---|---|---|---|---|
| 1 | SAMPLE A | Mr - B | P5 | 60% P4 | IN PROCESS OF TRANSMISSION | ON | P1, P2, P3 |

FIG. 13

JOB MANAGING TABLE (A)

| JOB NO. | JOB NAME | OWNER NAME | RECEIVED DATA (PRINTING STANDBY DATA) | DATA IN PROCESS OF PRINTING |
|---|---|---|---|---|
| 1 | – | – | – | – |

JOB MANAGING TABLE (B)

| JOB NO. | JOB NAME | OWNER NAME | RECEIVED DATA (PRINTING STANDBY DATA) | DATA IN PROCESS OF PRINTING |
|---|---|---|---|---|
| 1 | SAMPLE A | Mr – B | 30% P1 | – |

JOB MANAGING TABLE (C)

| JOB NO. | JOB NAME | OWNER NAME | RECEIVED DATA (PRINTING STANDBY DATA) | DATA IN PROCESS OF PRINTING |
|---|---|---|---|---|
| 1 | SAMPLE A | Mr – B | P2, P3, 40% P4 | P1 |

PRINT CONTROL APPARATUS AND PRINT CONTROL METHOD CAPABLE OF CANCELING PRINT JOB

BACKGROUND OF THE INVENTION

1. Field of the Invention

The present invention relates to an information processing apparatus, a print control apparatus, an information processing method, and a print control method in a print system in which a host computer transmits print data constructing a print job to a printer and the printer prints data on the basis of the print data.

2. Description of the Related Art

Hitherto, there has been used a print processing system in which a host computer forms data (such as aggregate data and document data), the formed data as print data is transferred to a print output apparatus (referred to as a printer, hereinbelow), and the transferred data is outputted to paper, etc.

SUMMARY OF THE INVENTION

According to a conventional technique, although a print server can cancel a print job that stands by a printing process, it is difficult to cancel a print job whose printing process is waited by a printer and a print job whose printing process is started by the printer but output is not completed. Note that the cancel of the print job means the deletion of the print data regarding the print job and the stop of a process for printing the print data regarding the print job, namely, a series of processes for avoiding the output of the print job.

As a system capable of canceling the print job in the printer, a system shown in FIG. 5 is devised. In particular, FIG. 5 shows a processing routine to cancel the print job halfway through transferring the print job from a host computer to the printer.

First, the host computer starts transferring the print data of the print job (step S501). The printer starts receiving the print data (step S511). The host computer accepts an instruction to cancel the print job, when the user presses a "cancel button" in a dialogue shown in FIG. 11 in process of transferring the print data (step S502). Further, the transfer of the print data is stopped in accordance with the cancel instruction (step S503).

Although the transfer of the print data is stopped for the present in step S503, the printing process is executed for the print data which has been already received to the printer. Therefore, the avoidance of an unnecessary output necessitates a process for deleting the print data which has been already received to the printer and stopping the process for printing the print data.

Accordingly, the user activates a utility for deleting the print data in the printer and stopping the process for printing the print data by the host computer (step S504). The utility (or the host computer according to the utility) transfers, to the printer, a control command to request information indicative of a situation of the printing process in the printer (step S505).

In order to respond the control command, the printer returns the information indicative of the situation of the printing process to the host computer (step S512). The utility displays a picture plane shown in FIG. 10 on the basis of the information (step S506).

The user checks to see for which print job the cancel instruction is issued (for which print job the cancel instruction is issued in step S502), while seeing the picture plane shown in FIG. 10, selects the print job, and presses the "cancel" button. The host computer recognizes for which print job, the user issues the cancel instruction (step S507). The host computer transfers a control command to delete the print data and stop the process for printing the print data to the printer (step S508).

The printer deletes the relevant print data and stops the process for printing the relevant print data in accordance with the control command (step S513).

Consequently, it is able to avoid the unnecessary output and prevent unnecessary consumption for paper and toner, etc., when the user finds out something unsatisfactory (such as an erratum and a hiatus in a paragraph of the print data) in the print data in the print job and there is a mistake in the output format of the print data (such as sheet size and layout) after the user issues the output instruction of the print job.

However, according to the system, the user must execute an operation to issue the cancel instruction of the print job in steps 502 and 507, namely, twice so as to prevent the unnecessary output. Accordingly, the load for the user is increased in accordance with the canceling process of the print job.

The processes in steps S504 to 508 must be conducted until the print data in the printer is actually deleted and the process for printing the print data is stopped after issuing the first cancel instruction and, therefore, the process for printing the print data might advance in the printer unnecessarily for a time in steps 504 to 508, thereby performing no cancel of the print job speedily. Particularly, it might be impossible for a printer having a high-speed processing capacity to avoid the unnecessary output because the deletion of the print data and the stop of the process for printing the print data are not in time for the completion of the print data output.

To solve the above problem, according to the present invention, there is provided an information processing apparatus for transmitting print data constructing a print job, comprising: transfer means for transferring the print data; and detecting means for detecting an instruction to cancel the print job, wherein the transfer means transfers the print data including predetermined information when the detecting means detects the instruction to cancel the print job.

To solve the above problem, according to the present invention, there is provided a print control apparatus for receiving print data constructing a print job, comprising: receiving means for receiving the print data; analyzing means for analyzing whether or not predetermined information is included in the print data received by the receiving means; and control means for control an operation to cancel the print job constructed by the print data when the predetermined information is included as the analysis result by the analyzing means.

To solve the above problem, according to the present invention, there is a print system having an information processing apparatus for transmitting print data constructing a print job and a print control apparatus for receiving the print data, wherein the information processing apparatus comprises: transfer means for transferring the print data; detecting means for detecting an instruction to cancel the print job, and the transfer means transfers the print data including predetermined information when the detecting means detects the instruction to cancel the print job, and the print control apparatus comprises: receiving means for receiving the print data; analyzing means for analyzing whether or not predetermined information is included in the print data received by the receiving means; and control means for control an operation to cancel the print job constructed by the print data when the predetermined information is included as the analysis result by the analyzing means.

According to the present invention, there is provided a print method for implementing the aforementioned print system.

According to the present invention, there is provided an information processing method of implementing the above-discussed information processing apparatus, and according to the present invention, there is provided a recording medium to which an information processing program for implementing the above-discussed information processing apparatus is stored.

According to the present invention, there is provided a print control method for implementing the above-stated print control apparatus, and according to the present invention, there is provided a recording medium to which a print control program for implementing the above-stated print control apparatus is stored.

BRIEF DESCRIPTION OF THE DRAWINGS

FIG. 9 is a diagram showing a state for receiving/transmitting the print data between the host computer and the printer;

FIG. 10 is a diagram showing one example of a picture plane to display a situation of a printing process by the printer;

FIG. 11 is a diagram showing one example of a cancel dialogue;

FIG. 12 comprises four parts that are diagrams of examples of a print job information table;

FIG. 13 comprises three parts that are diagrams showing examples of a job managing table;

DESCRIPTION OF THE PREFERRED EMBODIMENTS

<Print Processing System>

Figure 6:
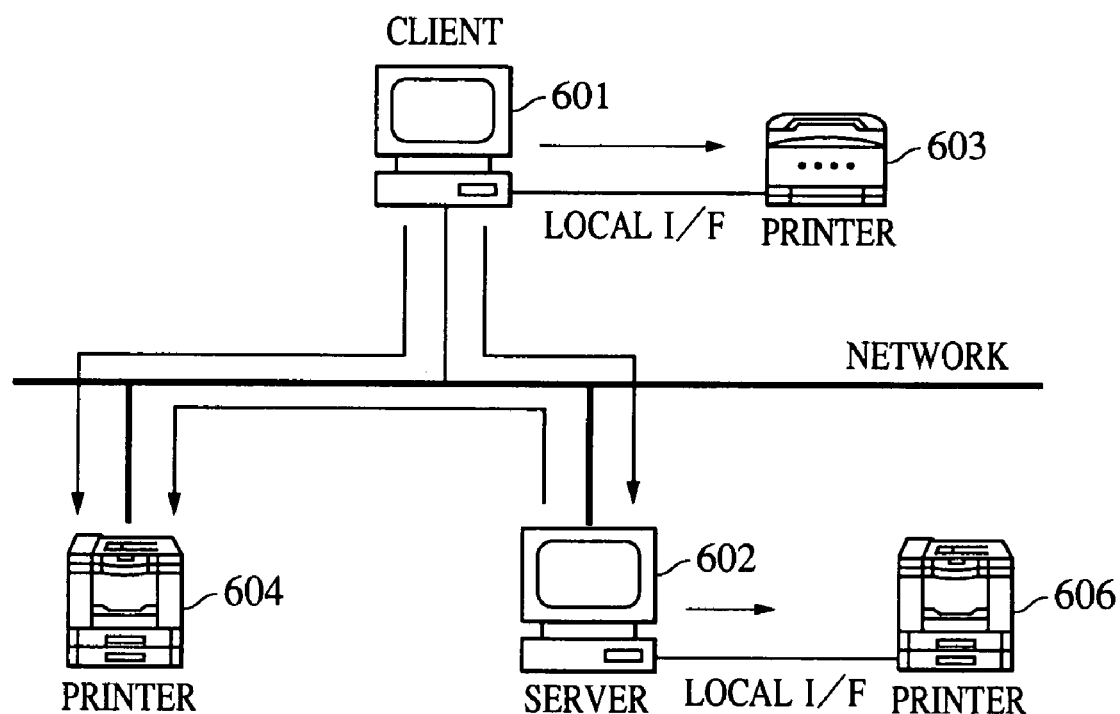
FIG. 6 is a diagram showing a system structure of a print processing system.

The first description turns to a print processing system according to the present invention. FIG. 6 is a diagram showing a system structure of the print processing system according to the present invention. Referring to FIG. 6, a client computer 601 and a server host computer 602 are connected to a network. Printers 603 and 606 are connected to the client host computer 601 and the server host computer 602 via a local interface, respectively. A printer 604 is connected to the network.

As for a connecting form of the host computer and the printer, the following cases are exemplified: the client host computers 601 and the server host computer 602 are connected to the printers 603 and 606 via the local interface; the client host computer 601 is connected to the printers 606 and 604 through the server host computer 602; the client host computer 601 and the server host computer 602 are connected to the printer 604 through the network; and the like. All of the cases are similar.

<Control Construction of the Print Processing System>

Figure 1:
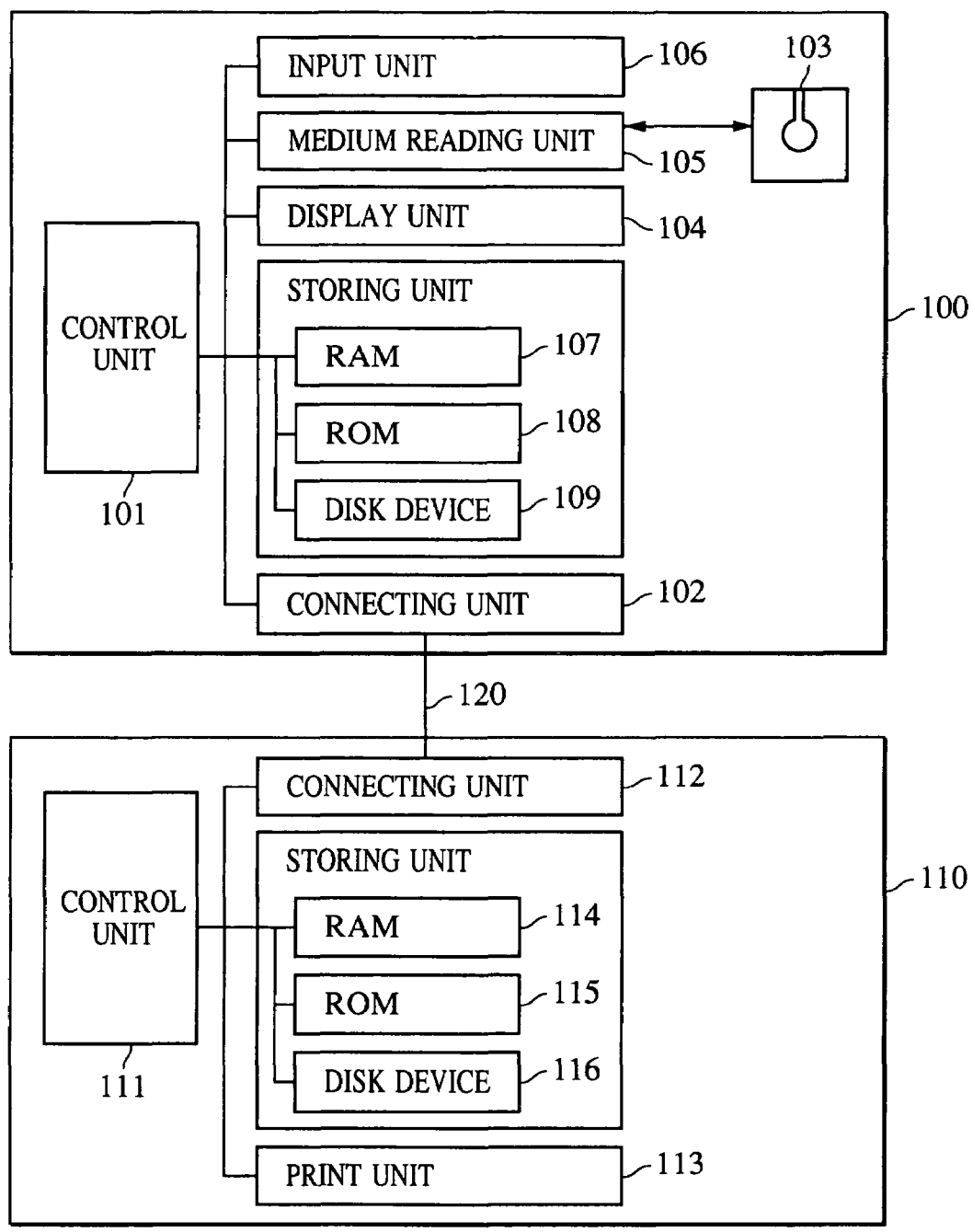
FIG. 1 is a block diagram showing a control construction when a host computer connects to a printer via a communicating medium.

FIG. 1 is a block diagram showing a control construction when the host computer is connected to the printer by way of a communicating medium. A host computer 100 is connected to a printer 110 through a communicating medium 120. It is noted that the host computer 100 is equivalent to the client host computer 601 and the server host computer 602 in FIG. 6, the printer 110 is equivalent to the printers 603, 604, and 606 in FIG. 6, and the communicating medium 120 is equivalent to the network and the local interface in FIG. 6.

The host computer 100 comprises: an input unit 106; a recording medium reading unit 105; a display unit 104; an RAM 107; an ROM 108; a disk device 109; a control unit 101; and a connecting unit 102. The control unit 101 executes a document processing program which is stored to the ROM 108 or disk device 109, and collectively controls the constructions. There are stored into the ROM 108 or disk device 109 an operating system program (referred to as an OS, hereinlater) and font data used upon a document process as well as the document processing program. Further, document data, etc. formed on the document processing program are also stored to the disk device 109. The RAM 107 is utilized as a main memory of the control unit 101 and a work area, etc.

The input unit 106 receives an input by the user from a keyboard or pointing device (not shown). The display unit 104 displays a variety of items of information to a display device or the like and provides a graphical interface to the user. The recording medium reading unit 105 controls the access to a recording medium such as a floppy disk 103 and a CD-ROM, etc. The connecting unit 102 controls an operation to communicate with the printer 110.

The printer 110 comprises: a control unit 111; a connecting unit 112; an RAM 114; an ROM 115; a disk device 116; and a print unit 113. The connecting unit 112 controls the communication between the host computer 100 and the printer 110, thereby actually receiving the print data. The control unit (CPU) 111 controls the whole operation for the printer 110. The print unit 113 outputs the data to a paper medium, based on the print data received by the connecting unit 112. A recording unit of the printer comprises: the ROM (read only memory) 115; the RAM (random access memory) 114; and the disk device 116. The RAM 114 is a data storing area which has no regulation for use, and utilized as a receiving buffer of the print data or an area to store image data generated on the basis of print data.

A program and associated data to implement the present invention are stored to the disk device 109 in the host computer 100, and loaded into the RAM 107 and executed by the control unit 101 when activating the host computer 100. Similarly, the program and associated data to implement the present invention are stored into the ROM 115 in the printer 110, and loaded into the RAM 114 and executed by the control unit 111 when activating the printer 110. It is to be noted that the program to implement the present invention has a program code based on flowcharts in FIGS. 14 and 15.

The user may insert the recording medium 103 into a recording medium inserting portion 201 in the host computer, and the medium reading unit 105 in the host computer 100 may load the program and associated data to implement the present invention from the recording medium 103 to the RAM 114.

<Functional Construction of the Print Processing System>

Figure 16:
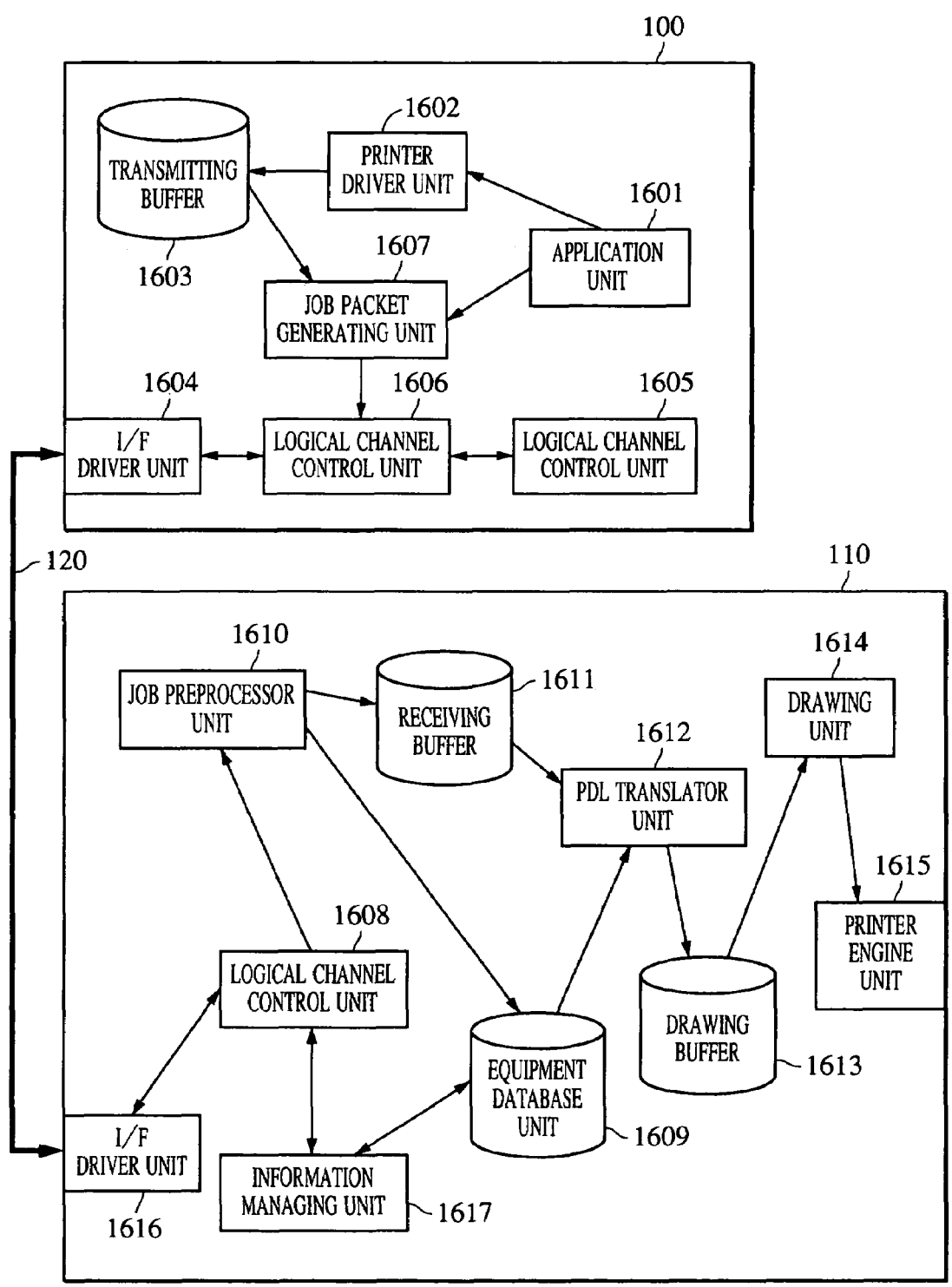
FIG. 16 is a block diagram showing a functional construction of the host computer and the printer.

The next description turns to the functional construction of the host computer and the printer in the print system according to the present invention. FIG. 16 is a block diagram showing the functional construction of the host computer and the printer. Note that the functional construction is provided on a control construction in FIG. 1.

The functional construction of the host computer 100 comprises: an application unit 1601; a printer driver unit 1602; a transmitting buffer 1603; an I/F driver unit 1604; a utility unit 1605; a logical channel control unit 1606; and the job packet generating unit 1607.

Describing the functions of the above units in detail, the application unit 1601 provides a graphical user interface to the user, and generates document data suitable for the user's purpose. The printer driver unit 1602 converts document data generated by the application unit 1601 into page description language (PDL) data which is printable by the printer 110. The transmitting buffer 1603 temporarily the PDL data which is generated by the printer driver unit 1602. The job packet generating unit 1607 generates job packet data from the PDL data stored to the transmitting buffer 1603 (as will be explained, using FIGS. 17 and 18, hereinafter). The utility unit 1605 acquires information of the printer 110, displays the acquired information to the graphical user interface, and changes the environment setting of the printer 110 according to the user's desire.

The logical channel control unit 1606 converts into one physical channel, two logical channels; a data channel to transfer job packet data transmitted from the job packet generating unit 1607; and a managing channel to obtain a state of receiving/transmitting the data to/from the utility unit 1605 and transfer managing packet data for environment setting. That is, the logical channel control unit 1606 controls an operation to receive/transmit two different kinds of data via one interface, because the communicating medium 120 is one physical interactive interface. The I/F driver unit 1604 actually receives/transmits data to/from the printer under the control by the logical channel control unit 1606.

On the other hand, the functional construction of the printer 110 comprises: a logical channel control unit 1608; an equipment database unit 1609; a job pre-processor unit 1610; a receiving buffer 1611; a PDL translator unit 1612; a drawing buffer 1613; a drawing unit 1614; a printer engine unit 1615; an I/F driver unit 1616; and an information managing unit 1617.

Describing the functions of the above units in detail, the I/F driver unit 1616 actually receives/transmits data to/from the host computer 100. The logical channel control unit 1608 distributes the packet data and managing data which are received by the I/F driver unit 1616 to the post stage. The job packet data might be transmitted to the job pre-processor unit 1610, and the managing packet data might be transmitted to the information managing unit 1617.

The job pre-processor unit 1610 receives the job packet data from the logical channel control unit 1608, and transfers the PDL data to the receiving buffer 1611 and sets information to the equipment database unit 1609 in accordance with an operation code stored to a packet header portion of the job packet (as will be discussed hereinafter, using FIG. 17).

Figure 19:
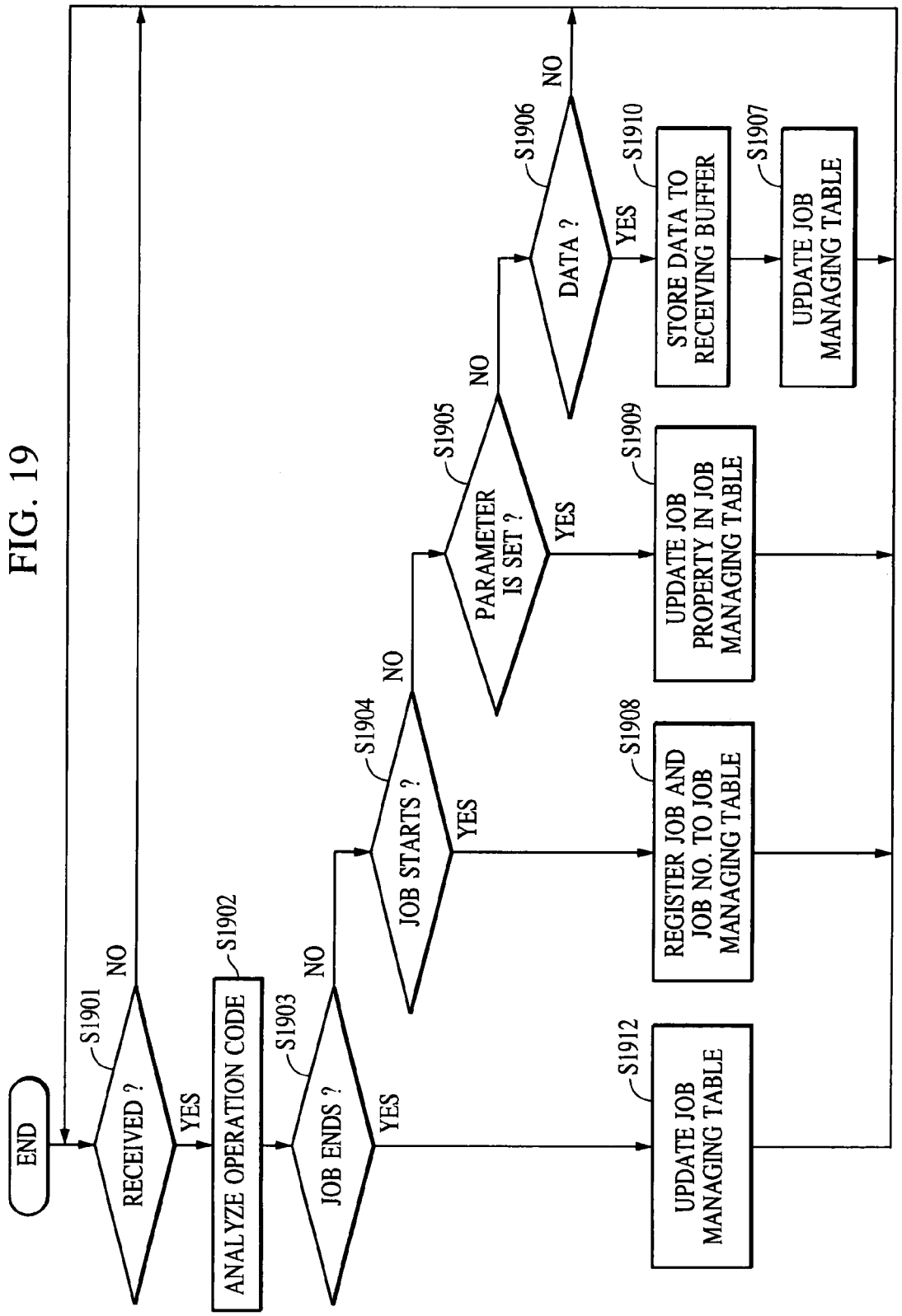
FIG. 19 is a flowchart showing an operation when a job pre-processor unit receives the job packet.

As will be stated hereinbelow, using FIG. 19, if the operation code of the job packet is a job start command, a job number is allocated and set to a job managing table in the equipment database unit 1609. If the operation code of the job packet is a PDL data transmitting operation, the PDL data and the job number are transferred to the receiving buffer 1611. The job pre-processor unit 1610 updates a column of the data received by the equipment database unit 1609, each time transferring the PDL data to the receiving buffer 1611. If the operation code of the job packet is a job property setting operation, the contents of a parameter are set to the job managing table in the equipment database unit 1609.

When storing all of the PDL data of a certain job number into the receiving buffer 1611, the job pre-processor unit 1610 stores such a fact the column of the received data in the job managing table of the equipment database unit 1609.

The receiving buffer 1611 temporarily holds the PDL data to which the job number is allocated, and becomes a buffer body against the delay at the post stage. The equipment database unit 1609 stores equipment information and the job information of the print job of the printer 110. Note that the job managing table of the equipment database unit 1609 will be mentioned hereinafter with reference to FIG. 13.

The information managing unit 1617 receives the managing packet transmitted through the managing channel, and rewrites the information of the equipment database unit 1609 and controls the print job in accordance with the operation code of the managing packet and the data thereof.

The PDL translator unit 1612 performs a translating process of the PDL data, converts the data into a drawing object (intermediate data) suitable for the drawing, and stores the converted data into the drawing buffer 1613. The drawing buffer 1613 temporarily stores the drawing object until the drawing object is subjected to a printing process. If storing to the drawing buffer 1613 a drawing object of one page, the drawing unit 1614 starts the printing process for the drawing object.

The drawing unit 1614 actually draws the drawing object which is temporarily stored to the drawing buffer 1613, generates a bit map image, and transmits the bit map image to the printer engine unit 1615. If starting to generate the bit map image of a new job number, the drawing unit 1614 updates a column of the data in process of printing in the job managing table of the equipment database unit 1609.

The printer engine unit 1615 receives the bit map image generated by the drawing unit 1614, and outputs the image to a medium such as paper by a well-known printing technique.

<Print Job>

The print job comprises a plurality of job packets. Each job packet comprises a packet header portion and a data portion. The job packet as one-lump data is transmitted to the printer 110 from the host computer 100. Herein, the packet is a packet under a narrower term, serving as a packet on data communication in the network, but a packet under a broader term serving as a data lump regarding the print job.

Figure 17:
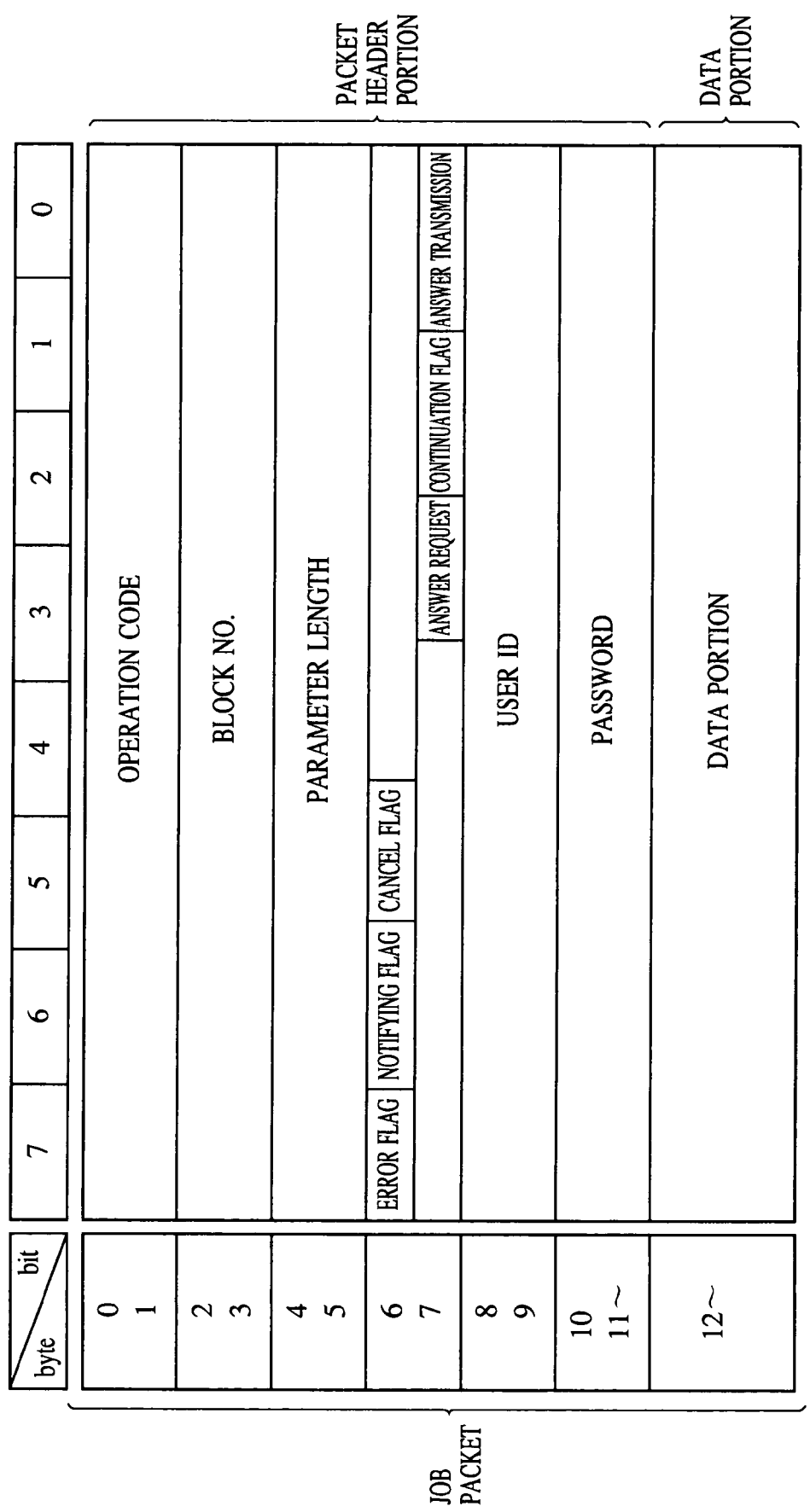
FIG. 17 is a structural diagram showing a structure of a job packet.

FIG. 17 is a structural diagram showing a structure of the job packet. The axis of the ordinate indicates a byte and the axis of the abscissa indicates a bit of each byte. In the figure, operation codes of a 0-th byte to a first byte denote an ID of a 2-byte length indicative of a packet function. The operation code can has the following values:

0x0201 job start operation
0x0202 job property setting operation
0x0204 PDL data transmitting operation
0x0205 job end operation "0x" means a hexadecimal notation. The job start operation is an operation code of the job packet indicative of the print job start. The job property setting operation is an operation code of the job packet to set the property of the print job. The PDL data transmitting operation is an operation code of the job packet to which the PDL data is stored. The job end operation is an operation code of the job packet indicative of the print job end. The job control operation is an operation code of the job packet to control the print job.

Block numbers of a second byte to a third byte are numbers used for correspondence between the request and answer when a side to transmit the job packet requests an answer. When the host computer 100 sequentially transmits the job packets of the block numbers 1, 2, and 3, the transmitting side can specify that an error causes in the job packet which is transmitted at the second time in the case where the printer 110 returns the error packet of the block number 2.

An area as a parameter length of a forth byte to a fifth byte shows a byte length of the data portion subsequent to a twelfth byte, and can indicate a length of 0 to 64 KB. The parameter length might differ by depending on the property indicative of the packet header.

An area as the parameter length of a sixth byte to a seventh byte shows various flags of the job packet, and can indicate the following values:

Error flag: when the value of the error flag is equal to 1, this indicates that any error causes in the printer 110. The flag is added to a returning packet which is transmitted from the printer 110 to the host computer 109.

Notifying flag: when the value of the notifying flag is equal to 1, this indicates that there is not the answer for the requesting packet from the host computer 100, but there is any notifying item from the printer 110 and the presence of the notifying item is notified to the host computer 100.

Continuation flag: when the value of the continuation flag is equal to 1, this indicates that the remaining data is transmitted in the next job packet because all of the data is not included in the data portion. The next job packet has to set the same operation code as that of the former job packet.

Answer request: when an answer packet from the host computer 100 to the printer 110 is necessary, "1" is set. When 0, the answer is not returned in the case where the requesting packet is normally processed. If an error causes in the printer 110, the answer packet is transmitted by always setting the error flag to 1, irrespective of 0/1 of the answering request.

Cancel flag: when the cancel flag has a value of 1, this indicates that the cancel instruction of the print job is issued.

A user ID exists in a job packet between an eighth byte and a ninth byte and a password exists in a job packet between a tenth byte and an eleventh byte. Those areas are used for authentication when adding a security limit to the operation by the requesting packet.

Data (parameter and PDL) is stored to a job packet byte subsequent to a twelfth byte in accordance with the operation code. In case of the job start operation and the job end operation, no data exists.

In case of the job property setting operation, the operation is effected to set a desired job property ID and a desired job property value. The job property ID indicates an identifier corresponding to the property regarding the print job. The job property ID is previously allocated. This job property ID corresponds to the property of the job property specified by an ISO-10175 (DPA) (ISO: International Standardization Organization). Representative job properties are exemplified as follows:

0x0101 job name
0x0103 job owner name
0x016a job size

In case of the PDL data transmitting operation, the PDL data is included in the data portion. Data of one job packet is limited to the maximum size which can be stored to the parameter length. Therefore, data of up to 64 KB can be stored. Data more than 64 KB is divided into a plurality of job packets and transmitted. The operation code in each job packet indicates the PDL data transmitting operation. The continuation flag of the job packets is equal to 1.

<Generation of the Job Packet>

Figure 18:
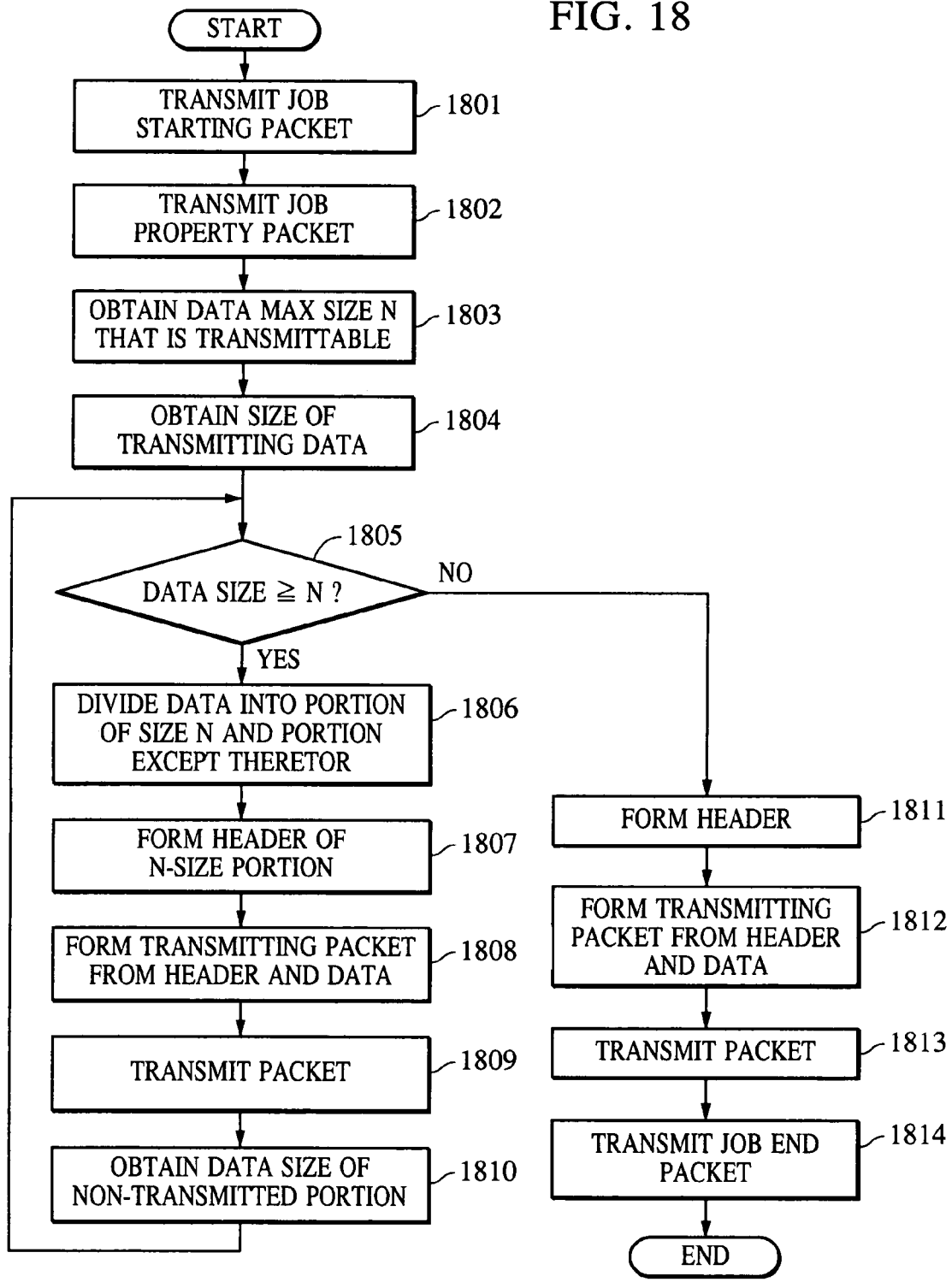
FIG. 18 is a flowchart showing an operation for generating a job packet regarding one print job by a job packet generating unit.

FIG. 18 is a flowchart showing an operation that the job packet generating unit 1607 generates the job packet regarding one print job. If the user issues an instruction to print the document data after generating the document data by the application unit 1601, the document data is transmitted to the printer driver unit 1602 through a GDI (graphical Device Interface), etc. from the application unit 1601. The printer driver unit 1602 generates the PDL data on the basis of the data transmitted from the GDI, and stores the PDL data into the transmitting buffer 1603. When the PDL data is sequentially generated to the transmitting buffer 1603, the job packet generating unit 1607 starts a process for generating the job packet.

In step 1801, the job packet generating unit 1607 generates the job start packet and transmits it to the logical channel control unit 1606. The job start packet indicates that the operation code in the packet header portion (in FIG. 17) is the job start operation ("0201"). The identifier of the job issued by the job packet generating unit 1607 is included in the data portion of the job start packet.

The job packet generating unit 1607 generates the job property packet and transmits the generated job property packet to the logical channel control unit 1607 in step 1802. The job property packet is a job packet showing that the operation code of the packet header portion (in FIG. 17) is a job property setting operation ("0202"). A property ID and a property value regarding the relevant print job are included in the data portion of the job property packet. As mentioned above, the job property has the job name, job owner name, job size, etc. It is noted that the job name can be obtained by the printer driver unit 1602 from the GDI, the job owner name can be obtained from the user's name when the user logs on by utilizing a function as an accessory to the OS, and the job size can be obtained by internally calculating the PDL generated by the printer driver unit 1602.

The job packet generating unit 1607 obtains a maximum size N in the data transmittable by the job packet in step 1803. As expressed above, according to the present embodiment, the maximum size of the data transmittable by the job packet is 64 KB.

The job packet generating unit 1607 obtains a size of the data to be transmitted, specifically speaking, the size of the PDL data stored in the transmitting buffer 1603 in step 1804. It is discriminated whether or not the size of the transmitting data (PDL data) obtained in step 1804 is larger than the maximum size N in step 1805. If it is determined that the size of the transmitting data is larger than the maximum size N (YES in step 1805), the processing routine advances to step 1806, the job packet generating unit 1607 divides the PDL data into a portion from the head to the size N (64 KB, herein) and a portion except therefor (remaining portion).

The job packet generating unit 1607 generates the packet header of the transmitting data packet to which the PDL data from the head to the size N is stored in step 1807. The transmitting data packet is a job packet showing that the operation code in the packet header portion (in FIG. 17) is a PDL data transmitting operation ("0204"). The continuation flag in the packet header portion is set to "1" at this time.

The job packet generating unit 1607 couples the packet header to the PDL data from the head to the size N, thereby forming the transmitting data packet in step 1808. In other words, the PDL data of the size N is included in the data portion of the job packet as it is.

The job packet generating unit 1607 transmits the formed job packet to the logical channel control unit 1606 in step 1809. In step S1810, the job packet generating unit 1607 obtains the size of the PDL data which is not transmitted, and the processing routine returns to step 1805.

If it is determined that the size of the transmitting data is not larger than the maximum size N in step 1805, the processing routine advances to step 1811, and the packet header is generated similarly to step 1807. However, the continuation flag of the packet header is set to "0" in step 1811.

The job packet generating unit 1607 couples the packet header to the remaining PDL data, thereby forming the transmitting data packet in step 1812. In step 1813, the job packet generating unit 1607 transmits the formed transmitting data packet to the logical channel control unit 1606.

Finally, the job packet generating unit 1607 generates the job end packet and transmits the generated job end packet to the logical channel control unit 1606 in step 1814. The job end packet is a job packet showing that the operation code in the packet header portion (in FIG. 17) is a job end operation ("0205"). Actually, there are neither a parameter nor data in the data portion of the job end packet.

The above-explained manner results in generating a series of job packets regarding one print job and transmitting the generated job packets to the printer 110 from the host computer 100 by way of the logical channel control unit 1606.

<Reception of the Job Packet>

The next description turns to an operation when the job pre-processor unit 1610 in the printer 110 receives the job packet. FIG. 19 is a flowchart showing the operation when the job pre-processor unit 1610 in the printer 110 receives the job packet.

The logical channel control unit 1608 transfers the job packet transmitted from the host computer 100 to the job pre-processor unit 1610 and, on the other hand, transfers the managing packet to the information managing unit 1617. The job pre-processor unit 1610 discriminates whether or not the job packet is received in step S1901.

It is determined that the job packet is received (YES in step S1901), a process in step S1902 is executed to analyze the operation code in the packet header portion of the job packet.

It is discriminated whether or not the job packet is the job end packet in step S1903. If it is determined that the job packet is the job end packet (YES in step S1903), the processing routine advances to step S1912. A process in step S1912 is executed to write, into a column of the received data in the job managing table of the equipment database unit 1609, a fact that the print data of 100% in the print job regarding the job end packet has been received.

If it is determined that the job packet is not the job end packet (NO in step S1903), it is discriminated whether or not the job packet is the job start packet in step S1904. If it is determined that the job packet is the job start packet, the processing routine advances to step S1908. A process in step S1908 is executed to issue a job number to the print job regarding the job start packet and register the print job and the job number to the job managing table.

If it is determined that the job packet is not the job start packet (NO in step S1904), a process in step S1905 is executed to discriminate whether or not the job packet is the job property packet. If it is determined that the job packet is the job property packet, the processing routine advances to step S1909. A process in step S1909 is executed to update a column of the job property of the relevant print job in the job managing table.

If it is determined that the job packet is not the job property packet (NO in step S1905), a process in step S1906 is executed to discriminate whether or not the job packet is the transmitting data packet. If it is determined that the job packet is the transmitting data packet, the processing routine advances to step S1910. A process in step S1910 is executed to store the print data into the receiving buffer 1611. At this time, in order to enable to check to which print job, the relevant data belongs later, the job number as well as the print data is stored into the receiving buffer. A process in step S1907 is executed to check to which degree, the print data of the print job regarding the job packet has been already received and update a column of the received data in the job managing table.

<Process for Transmitting the Print Data>

Figure 14:
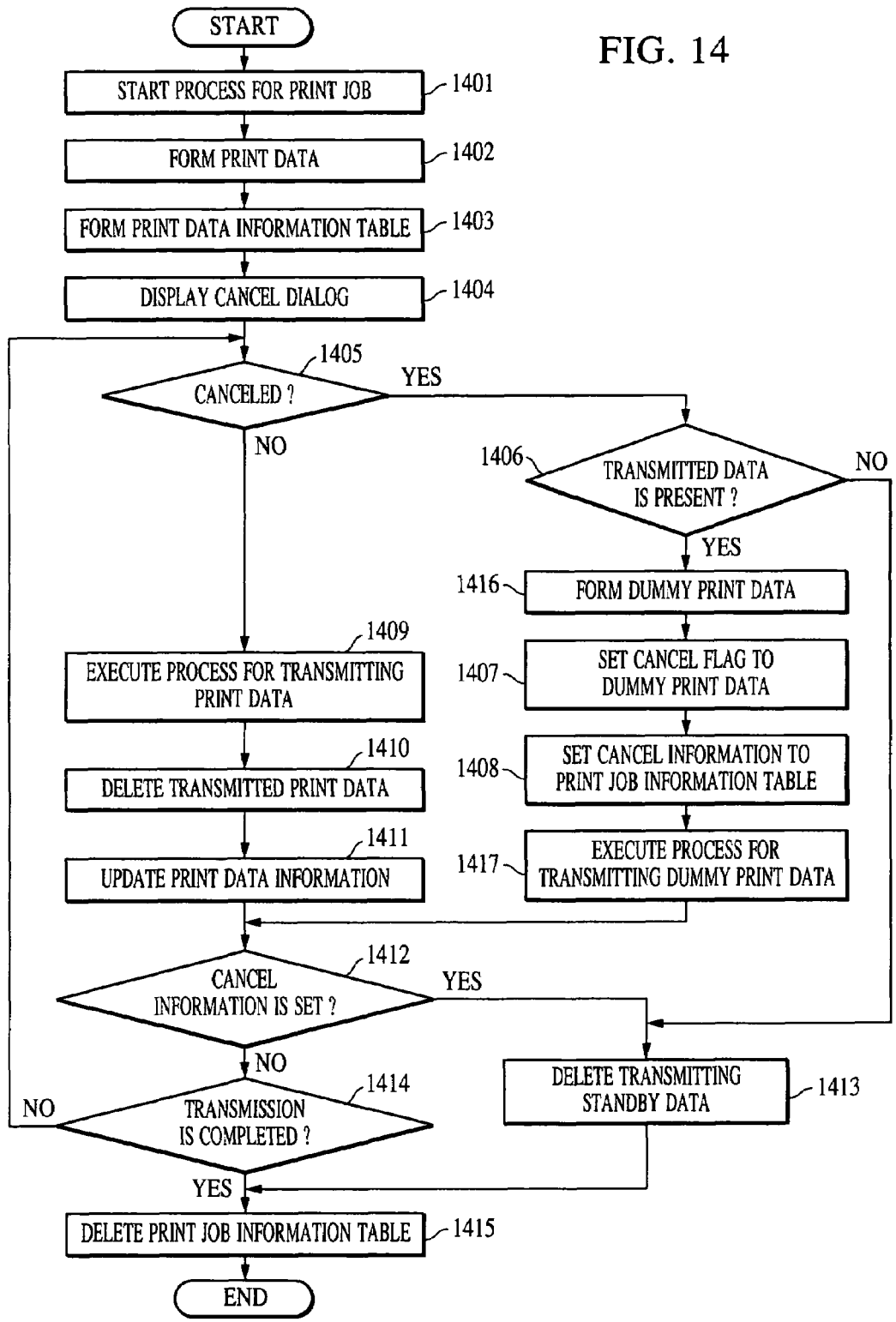
FIG. 14 is a flowchart showing an operation of a control unit of the host computer for an output instruction of the print job and the cancel instruction thereof by the user.

Based on the foregoing, the description turns to the operation of the host computer for the user's instruction to output the print job and the user's instruction to cancel the relevant print job. FIG. 14 is a flowchart showing the operation of the control unit 101 in the host computer 100 at this time. Note that it is assumed to generalize the operations of the functional construction (in FIG. 16) of the host computer 100, thereby setting them to the operation of the control unit 101 in the host computer 100.

Figure 7:
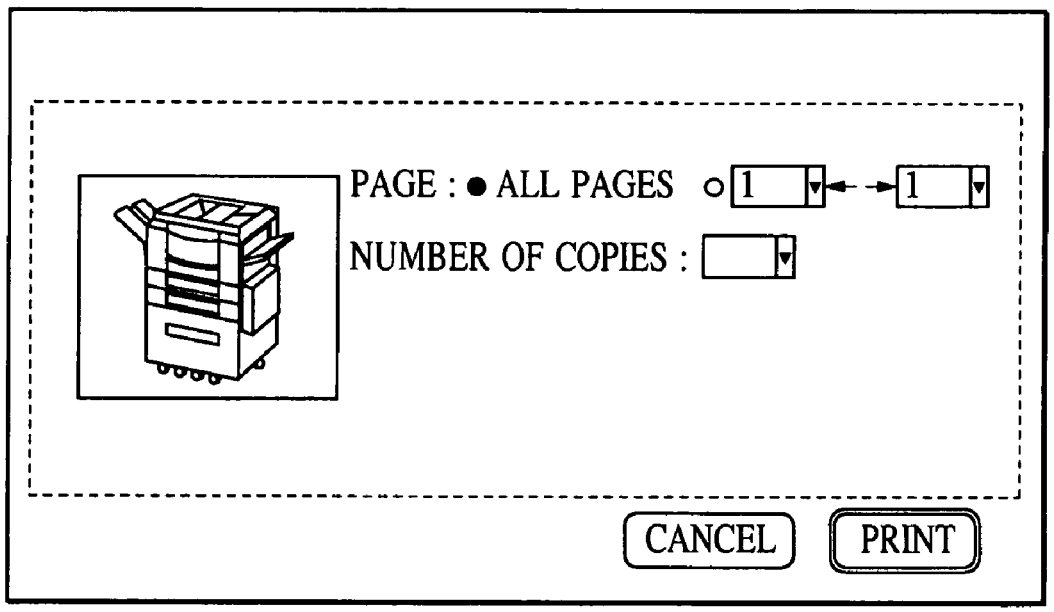
FIG. 7 is a diagram showing one example of a print dialogue as a user interface for a printer driver.

When the user presses a "print" button in a print dialogue (in FIG. 7) as a user interface for the printer driver unit 1602, the control unit 101 starts a process for the print job (step 1401). First, the print data (PDL data) of the print job is generated (step 1402). The next process is executed to form, to the RAM 107, print job information table used for the print job process (step 1403). FIGS. 12A to 12D illustrate examples of the print job information table.

The print job information table at this time is as illustrated in FIG. 12A. This example in FIG. 12A illustrates to issue an instruction to output the print job of the job name "sample A" and the owner name "Mr-B". The column of transmitting standby data unprocessed shows that the number of pages of the print job is equal to 5. Since the print data is still not transferred at this time, no transmitting data in process is absent and the status of the print job becomes the transmitting standby.

Subsequently, the control unit 101 starts to transfer the print data and also displays a cancel dialogue to the display unit 104 in FIG. 11 (step 1404). It is discriminated whether or not the user presses a "cancel" button in the cancel dialogue (step 1405).

If it is determined that the user does not press the "cancel" button (NO in step 1405), a process is executed to transmit the print data to the printer 110 (step 1409). Specifically speaking, processes are executed to generate the job packet by the job packet generating unit 1607 and transmit the job packet by the logical channel control unit 1606. The print data transmitted in step 1409 is deleted from the transmitting buffer (step 1410). A process is executed to update columns of the transmitting standby data unprocessed in the print job information table and the transmitting standby data in process therein (step 1411).

The print job information table in FIG. 12B is one example of the print job information table after updating in step 1411. The print job information table in FIG. 12B illustrates that a 1-page of the print job "sample A" is being transmitted and the 1-page of 70% enters a transmitting standby mode (the 1-page of 30% has been transmitted).

If it is determined in step 1405 that the user presses the "cancel" button (YES in step 1405), it is discriminated whether or not the transmitted data is present by referring to the print job information table stored to the RAM 107 (step 1406).

If it is determined that the transmitted data is not present (in case of the print job information table in FIG. 12A) (NO in step 1406), the transmitting standby data is deleted from the storing unit, irrespective of unprocessed data and data in process (step 1415). In case of the print job information table in FIG. 12A, the print data of five pages is made invalid (or deleted) in the print job "sample A". Subsequently, the print job information table is also erased (deleted) from the RAM 107

If it is determined that the transmitted data is present (in case of the print job information table in FIG. 12C) (YES in step 1406), processes in steps 1416, 1407, 1408, and 1417 are implemented to delete the print data which has been already transmitted to the printer 110 and stop the process for printing the print data.

Dummy print data is generated to the RAM 107 to transmit the cancel flag to the printer 110 (step 1416). Specifically speaking, the dummy print data is vacant print data that has no actual data. The cancel flag is set to the dummy print data (step 1407). The specific process is executed to set, to be equal to 1, a value of the cancel flag at the packet header portion in the transmitting data packet (as stated in <Generation of the job packet>) to which the dummy print data is stored.

"ON" is set to a column of the cancel in the print job information table (step 1408). The print job information table in FIG. 12D illustrates one example of the print job information table in steps after step 1408. A final process is implemented to transmit the dummy print data (step 1417). The specific process is executed to transmit, to the printer 110, the transmitting data packet to which the dummy print data is stored and the cancel flag at the packet header portion is set to be equal to 1.

The above-explanation indicates the processes when determining that the "cancel" button is pressed and the processes when determining that the "cancel" button is not pressed in step 1405. After the process in step 1411 or step 1417, the processing routine shifts to step 1412.

It is discriminated whether or not "ON" is set to the cancel column by referring to the print job information table (step 1412). If it is determined that "ON" is not set in the cancel column (in case of the print job information tables in FIGS. 12A, 12B, and 12C) (NO in step 1412), it is discriminated whether or not the transmission of all of the print data is completed (step 1414). If the transmission of all of the print data is completed (YES in step 1414), the processing routine advances to step 1415. If the transmission of all of the print data is not completed (NO in step 1414), the processing routine returns to step 1405.

If it is determined that "ON" is set in the cancel column (in case of the print job information table in FIG. 12D) (YES in step 1412), the transmitting standby data is deleted from the storing unit, irrespective of the unprocessed data and the data in process (step 1415). In case of the print job information table in FIG. 12D, the print data of two pages (P4 and P5) is made invalid (or deleted) in the print job "sample A". Subsequently, the print job information table is also erased (deleted) from the RAM 107

<Process for Receiving the Print Data>

Figure 15:
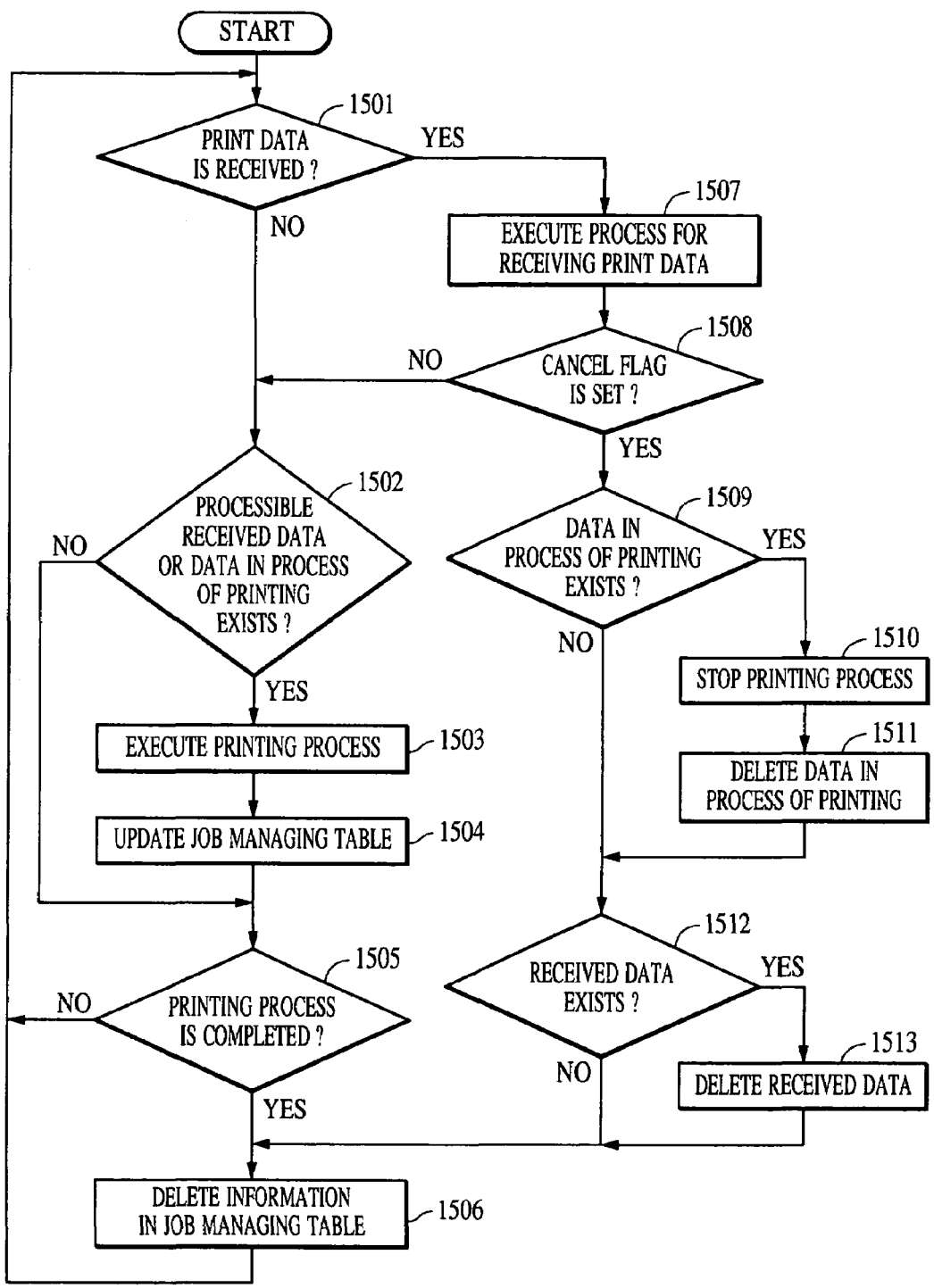
FIG. 15 is a flowchart showing an operation of a printer control unit upon a process for receiving print data.

The description turns to the operation of the printer 110 upon a process for receiving the print data. FIG. 15 is a flowchart showing the operation of the control unit 111 in the printer 110 at this time. Note that it is assumed to generalize the operations of the functional construction of the printer 110 (in FIG. 16), thereby setting them to the operation of the control unit 111 in the printer 110. Herein, the description relates to a flow for the process to receive the print data for an arbitrary print job.

To start with, the control unit 111 discriminates whether or not the print data from the host computer 100 is being received (step 1501). If the print data is being received (YES in step 1501), a process for receiving the print data is executed (step 1507). In this case, the process is executed to update a column of the received data in the job managing table. The job managing table in FIG. 13B illustrates that data of a 1-page of 30% in the print job "sample A" has been received.

It is checked to see if there is the received data in which the cancel flag is set (step 1508). The specific process is executed to discriminate the presence or absence of the transmitting data packet in which the cancel flag at the packet header portion is set to 1 in the received transmitting data packet. If it is determined that there is no print data in which the cancel flag is set (NO in step 1508), the processing routine shifts to step 1502.

It is discriminated whether or not printable received data or data in process of printing exists by referring to the job managing table (step 1502). In case of the job managing table in FIG. 13B, it is determined that no printable received data exists, because the reception of the 1-page data is not completed. In case of the job managing table in FIG. 13C, it is determined that both of the printable received data and the data in process of printing exist.

If it is determined that the printable received data or the data in process of printing exists (YES in step 1502), a printing process is implemented (step 1503). In accordance with the printing process, the job managing table is updated.

The specific process is executed to start the process for printing the print data of the 1-page and set the job managing table to the job managing table in FIG. 13C, when completing the reception of the print data of the 1-page in the print job "sample A".

It is discriminated whether or not all of the print data in the print job is printed in step 1505. If it is determined that all of the print data in the print job is printed, the information of the relevant print job is deleted from the job managing table (step 1506).

If it is determined that the print data in which the cancel flag is set exists in step 1508 (YES in step 1508), it is discriminated whether or not the print data is the print data of the print job to which the cancel instruction is issued and the print data in process of printing exists by referring to the job managing table (step 1509). If YES in step 1509, the process for printing the print data is stopped (step 1510). The print data is deleted (step 1511). The specific process is implemented to stop the process by the PDL translator unit 1612 and the drawing unit 1614, and cancel the data in process or make the data in process invalid.

It is discriminated whether or not the print data is the print data of the print job to which the cancel instruction is issued and the received print data exists by referring to the job managing table (step 1512). If YES in step 1512, the relevant print data is deleted (step 1513). The specific process is executed to delete or invalidate the print data stored to the receiving buffer 1611 or drawing buffer 1613, in accordance with the job number of the print job to which the cancel instruction is issued.

If finishing the process for canceling the print job as mentioned above, the information of the print job is deleted from the job managing table.

<Reception/Transmission of the Print Data Between the Host Computer and the Printer>

Figure 8:
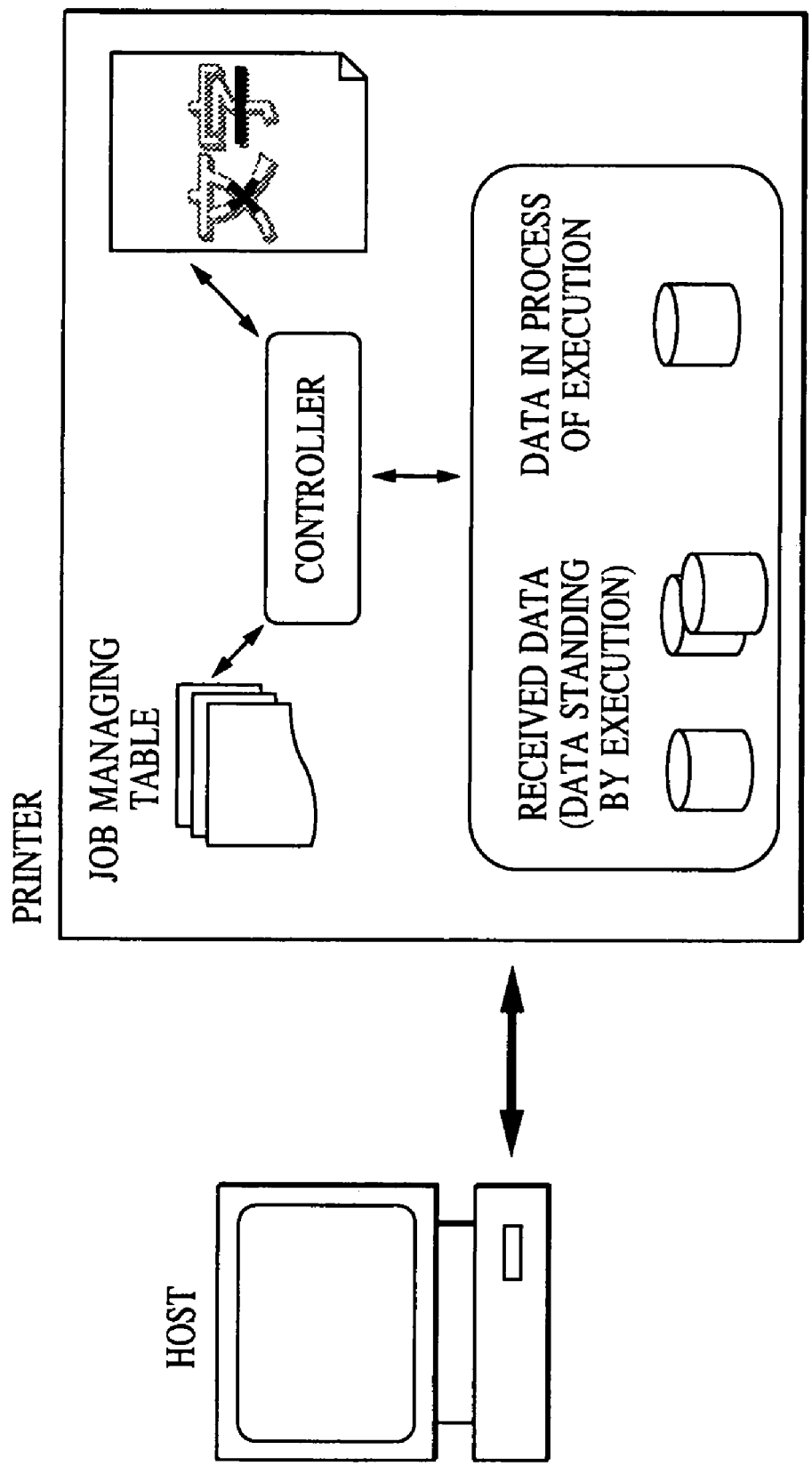
FIG. 8 is a conceptual diagram showing a print system.

FIG. 8 is a conceptual diagram showing the print system and FIG. 9 is a diagram showing a state for receiving/transmitting the print data between the host computer 100 and the printer 110. The host computer 100 first issues an instruction to output the print job in step (A) in FIG. 9, and then the print data of five pages enters a transmitting standby mode. The print data of a first page starts to be transmitted from the host computer 100 to the printer 110. The print data of 30% of the first page has been already transmitted and the transmission is completed in step (B) in FIG. 9.

The print data of a second page and third page is sequentially transmitted. The print data of a forth data is transmitted in steps (C) and (D) in FIG. 9.

Finally, the dummy print data is transmitted to the printer 110 from the host computer 100 in response to the instruction to cancel the print job in step (E) in FIG. 9.

<Construction of the Printer>

Figure 20:
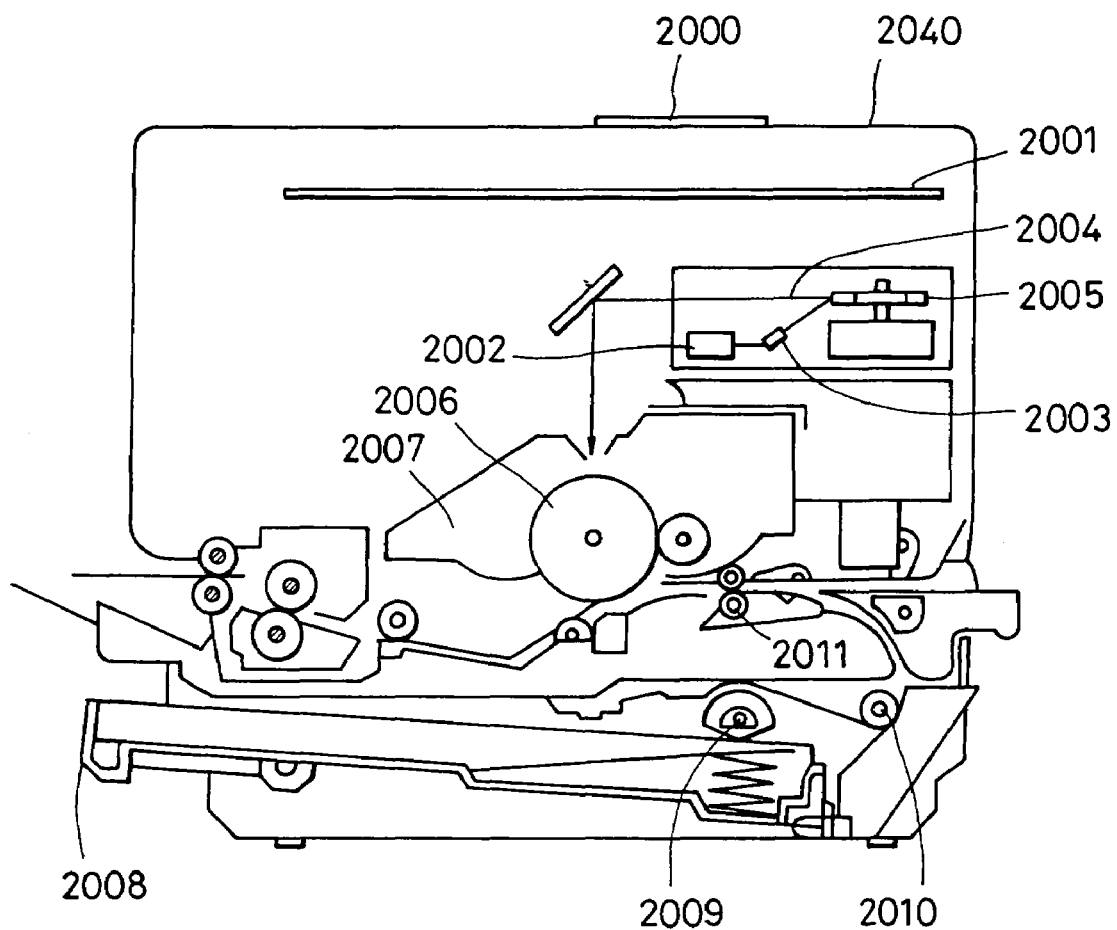
FIG. 20 is a sectional view showing an internal structure of a laser beam printer.

The description turns to a specific construction of the printer according to the present invention. As a printer, a laser beam printer (LBP) may be used. FIG. 20 is a sectional view showing an internal structure of the laser beam printer. Referring to FIG. 20, reference numeral 2040 denotes a main body to form an image on the recording paper as a recording medium, based on a supplied character pattern, etc; 2000 an operation panel onto which a switch for operation and an LED display, etc. are disposed; and 2001 a printer control unit to control the whole LBP 2040 and analyze the character pattern information, etc., which mainly converts the character pattern information into a video signal and outputs the video signal to a laser driver 2002.

The laser driver 2002 is a circuit to drive a semiconductor laser 2003, and switches on/off a laser beam 2004 emitted from the semiconductor laser 2003 in accordance with the inputted video signal. The laser beam 2004 is swung in the horizontal direction by a rotary polygon mirror 2005 and thus scans an electrostatic drum 2006. This results in forming an electrostatic latent image of the character pattern on the electrostatic drum 2006. The latent image is developed by a developing unit 2007 around the electrostatic drum 2006 and thereafter transferred to the recording sheet.

A cut sheet is used as the recording paper. The cut sheets as recording paper are accommodated into a plurality of sheet cassettes 2008 which corresponds to a plurality of kinds of paper and is mounted to the LBP 2040, taken in the printer by a paper feed roller 2009 and conveying rollers 2010 and 2011, and supplied to the electrostatic drum 2006.

Figure 21:
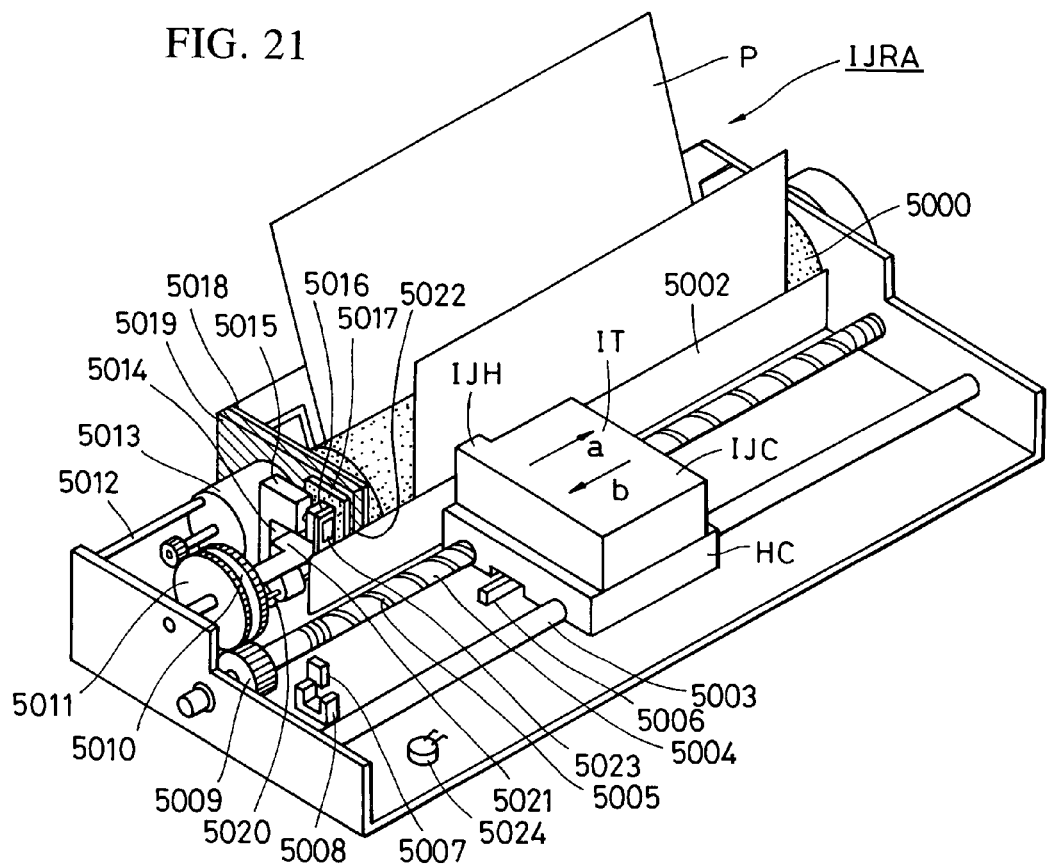
FIG. 21 is a synoptic diagram of an ink jet recording apparatus IJRA capable of feeding a plurality of kinds of paper in accordance with the print job.

Although the laser beam printer is described as an example, this invention is restricted by the laser beam printer. It is able to apply this invention to an ink jet printer, etc., which will be explained hereinafter. FIG. 21 is a synoptic diagram of an ink jet recording apparatus IJRA capable of feeding a plurality of kinds of paper (not shown) in accordance with a print job. Referring to FIG. 21, a carriage HC is brought into engagement with a spiral groove 5004 of a lead screw 5005 which is interlocked with the forward and reverse rotation of a driving motor 5013 and rotated via drive force transmitting gear 5011 and 5009. The carriage HC has a pin (not shown) and moved reciprocatedly in the arrows "a" and "b" directions. An ink jet cartridge IJC is mounted to the carriage HC. Reference numeral 5002 denotes a paper pressing plate to press paper to a platen 5000 along the moving direction of the carriage; 5007 and 5008 photocouplers which check the existence of a lever 5006 of the carriage in the area and serve as home position detecting means for switching the rotational direction of the motor 5013, etc.; 5016 a member for supporting a cap member 5022 to cap the front surface of a recording head; 5015 sucking means for sucking the inside of the cap, which sucks recovers the recording head via an in-cap opening 5023; 5017 a cleaning blade; and 5019 a member by which the cleaning blade can be moved in front and back direction. Those are supported to a main body supporting plate 5018. Obviously, as for a blade, the well-known cleaning blade can be applied to the present embodiment, in place of the blade having the above form. Reference numeral 5021 denotes a lever to start the suction for sucking and recover, which is moved in accordance with the movement of a cam 5020 brought into engagement with the carriage and is moved and controlled by the well-known transmitting means such as a clutch switch, etc. by employing a drive force from the driving motor. Although a desired process can be conducted for the capping, cleaning, and suction and recover by the operation of the lead screw 5005 at the corresponding position when the carriage comes to an area on the home position, so long as conducting the desired operation at the well-known timing, it is possible to apply any method of the capping, cleaning, and suction and recover to the present embodiment.

OTHER EMBODIMENT

It is noted that it is sufficient to apply the present invention to a system comprising a plurality of pieces of equipment (such as a host computer, interface equipment, a reader, and a printer), and to an apparatus comprising single equipment (such as a copying machine and a facsimile apparatus). It is also sufficient that the present invention is applied to a hybrid machine having a plurality of functions (such as copy, printing, and facsimile).

Figure 2:
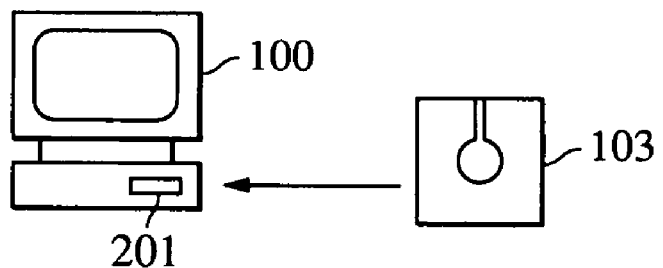
FIG. 2 is a diagram showing a method of supplying a program according to the present invention to a system or an apparatus.

Obviously, the object of the present invention is also accomplished by supplying to the system or apparatus shown in FIG. 2, a storing medium in which a software program code to implement the functions of the above embodiments, and reading out and executing the program code which is stored to the storing medium by a computer (CPU or MPU) of the system or apparatus. The program has a program code to control the operations in flowcharts in FIGS. 14, 15, 18, and 19 as mentioned above in the present embodiments. In this case, the program code itself which is read out from the storing medium implements the function of the foregoing embodiments and the storing medium which stores the program code constructs the present invention.

Figure 3:
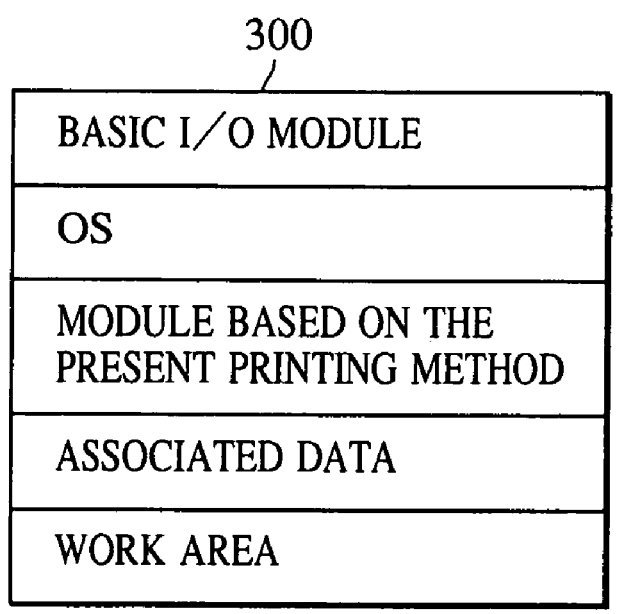
FIG. 3 is a diagram showing a memory map in a state in which a control program of a host computer according to the present invention is loaded into an RAM 107 and made executable.

FIG. 3 is a diagram showing a memory map in a state in which a control program of the host computer according to the present invention is loaded into the RAM 107 and made executable.

Figure 4:
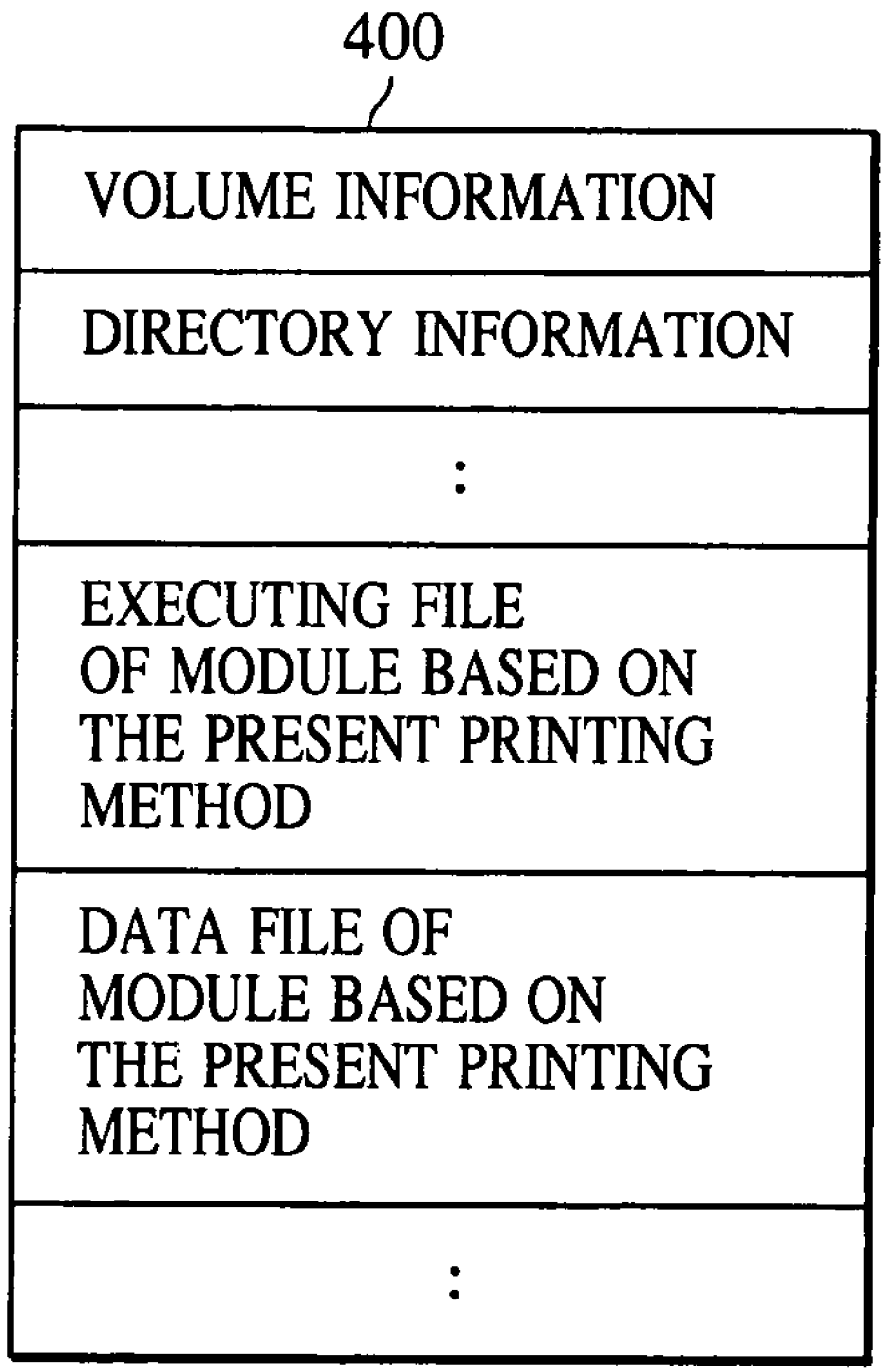
FIG. 4 is a diagram showing a memory map in a state in which the control program of a printer according to the present invention is loaded into an RAM 114 and is made executable.
Figure 5:
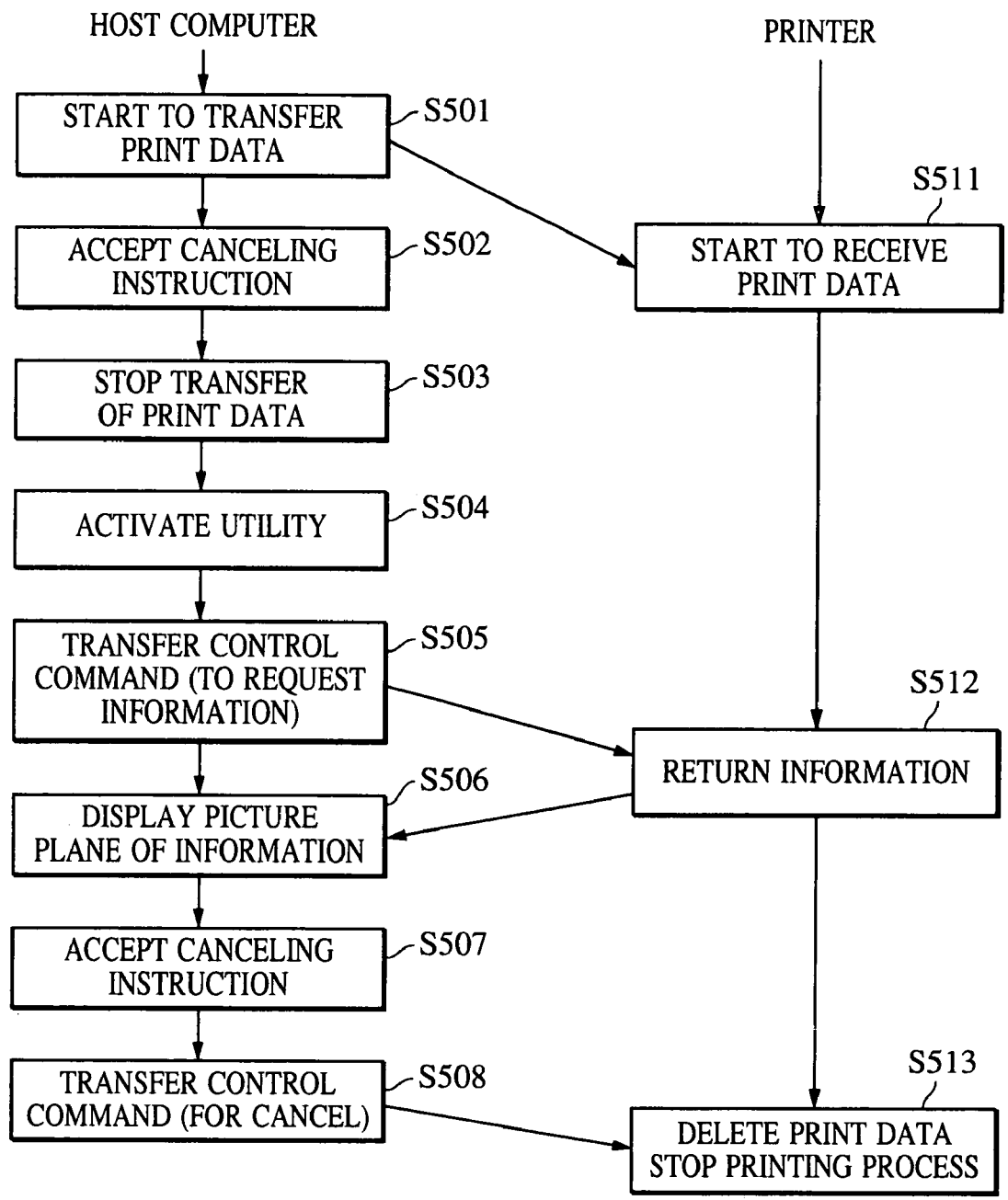
FIG. 5 is a flowchart showing a processing routine for canceling a print job.

FIG. 4 is a diagram showing a memory map in a state in which the control program of the printer according to the present invention is loaded into the RAM 114 and made executable.

Although the present embodiment shows the example such that the present control program and associated data are directly loaded into the RAM from the storing medium and executed, additionally, the present control program and associated data may be temporarily stored (installed) into the hard disk (disk device 109) serving as a nonvolatile storing medium from an external storing medium such as a floppy disk (FD) and loaded into the RAM from the hard disk when operating the present program to form the data and control the transmitting process.

As for a storing medium to supply the program code, it is able to use a floppy disk, hard disk, optical disk, magneto-optical disk, CD-ROM, CD-R, magnetic tape, nonvolatile memory card, ROM, and the like. Obviously, the functions of the aforementioned embodiments can be effected not only by executing the program code which is read out by the computer, but also by executing a part or all of the actual processes by the OS (Operating System) which operates on the computer on the basis of the instruction of the program code.

Obviously, the functions of the aforementioned embodiments can be further effected by writing the program code read-out from the storing medium into a memory provided for a function expansion board inserted to the computer or a function expansion unit connected to the computer, and thereafter executing a part or all of the actual processes by a CPU, etc. provided for the function expansion board or function expansion unit on the basis of the instruction of the program code.

According to the present invention, the dummy print data to which the cancel flag is set is transmitted to the printer when the user issues an instruction to cancel the relevant print job in process of transferring the print data in the print job, so that it is possible to delete the print data which has been already transmitted to the printer and stop the process for printing the print data, by instructing a cancel once.

Consequently, it is possible to reduce the user's load accompanied by the process for canceling the print job, and speedily effect the processes for actually deleting the print data in the printer and stopping the print of the print data after issuing the first cancel instruction.

What is claimed is:

1. An information processing apparatus which communicates with a printer having a job data channel which receives a print job, the information processing apparatus comprising:
   packets generating means for generating a plurality of job packets as a print job, wherein each job packet includes a header, and at least one of the headers identifies print data; and
   transfer control means for controlling transfer of the job packets generated by said packets generating means via the job data channel,
   wherein said packets generating means generates a cancel packet containing an instruction to cancel the print job if a cancel instruction of the print job is detected while transferring the job packets via the job data channel,
   wherein said transfer control means controls the transfer of the cancel packet via the job data channel, and
   wherein the printer stores data, taken from the job packets received via the job data channel, in a storage unit based on analyzing the header of the job packets, and the printer issues cancellation of processing of the print data if a cancel packet is confirmed based on analyzing the header of the job packets received via the job data channel.

2. The information processing apparatus according to claim 1, further comprising:
   a management table for managing a transfer status of a print job; and
   a cancel controlling means for canceling a print job retained in a host computer by referencing said management table.

3. The information processing apparatus according to claim 1, wherein the cancel packet comprises dummy data.

4. A printer having a data channel which receives print data and communicates with an information processing apparatus, the printer comprising:
   a first receiving device for receiving a plurality of job packets, via a job data channel, the job packets being generated by the information processing apparatus and each including a header, at least one of which identifies print data, as a print job;
   an analyzing device for analyzing the header of the job packets received by the first receiving device;
   a storage device for storing data, taken from the job packets received via the job channel, in a storage area based on the analysis of the analyzing device; and
   a canceling device for canceling processing of the stored print data if a cancel packet is confirmed based on the analysis of the analyzing device.

5. The printer according to claim 4, wherein said cancel packet comprises dummy data.

6. A processing method for an information processing apparatus which communicates with a printer having a job data channel which receives a print job, the processing method comprising the steps of:
   generating a plurality of job packets as a print job, wherein each job packet includes a header, and at least one of the headers identifies print data;
   generating a cancel packet containing an instruction to cancel the print job when a cancel instruction of the print job is detected while transferring the job packets via the job data channel; and
   controlling transfer of the cancel packet via the job data channel,
   wherein the printer stores data, taken from the job packets received via the job data channel, in a storage unit based on analyzing the header of the packets, and the printer issues cancellation of processing of the print data if a cancel packet is confirmed based on analyzing the header of the job packets received via the job data channel.

7. The processing method according to claim 6, further comprising a cancel control step for canceling a print job retained in a host computer in accordance with referencing a managing table which manages a transfer status of a print job.

8. The processing method according to claim 6, wherein the cancel packet comprises dummy data.

9. A processing method for a printer having a job data channel which receives print data, and that communicates with an information processing apparatus, the processing method comprising the steps of:
   receiving a plurality of job packets via the job data channel as a print job, wherein the job packets are generated by the information processing apparatus, each includes a header, and at least one of the headers identifies print data;
   analyzing the header of the job packets received in the receiving step;
   storing data, taken from the job packets received via the job data channel, in a storage unit based on the analyzing step; and
   canceling processing of the stored print data if a cancel packet is confirmed based on the analyzing step.

10. The processing method according to claim 9, wherein the cancel packet comprises dummy data.

11. A computer-readable storage medium on which are stored computer-executable process steps for a processing method for an information processing apparatus which communicates with a printer having a job data channel which receives a print job, the executable process steps comprising the steps of:
   generating a plurality of job packets as a print job, wherein each of the job packets includes a header, and at least one of the headers identifies print data;
   generating a cancel packet containing an instruction to cancel the print job when a cancel instruction of the print job is detected while transferring the job packets via the job data channel; and
   controlling transfer of the cancel packet via the job data channel,
   wherein the printer stores data, taken from the job packets received via the job data channel, in a storage unit based on analyzing the header of the packets, and the printer issues cancellation of processing of the print data if a cancel packet is confirmed based on analyzing the header of the job packets received via the job data channel.

12. The computer-readable storage medium according to claim 11, further comprising a cancel control step for canceling a print job retained in a host computer in accordance with referencing a managing table which manages a transfer status of a print job.

13. The computer-readable storage medium according to claim 11, wherein the cancel packet comprises dummy data.

14. A computer-readable storage medium on which are stored computer-executable process steps for a processing method of a printer, having a job data channel which receives print data and that communicates with an information processing apparatus, the executable process steps comprising the steps of:
   receiving a plurality of job packets via the job data channel, the job packets being generated by the information processing apparatus and each including a header, at least one of which identifies print data, as a print job;
   analyzing the header of the job packets received in the receiving step;
   storing data, taken from the job packets received via the job data channel, in a storage unit based on the analyzing step; and
   canceling processing of the stored print data if a cancel packet is confirmed based on the analyzing step.

15. The computer-readable storage medium according to claim 14, wherein the cancel packet comprises dummy data.

* * * * *

UNITED STATES PATENT AND TRADEMARK OFFICE
CERTIFICATE OF CORRECTION

| | |
|---|---|
| PATENT NO. | : 7,050,186 B1 |
| APPLICATION NO. | : 09/557913 |
| DATED | : May 23, 2006 |
| INVENTOR(S) | : Noda |

It is certified that error appears in the above-identified patent and that said Letters Patent is hereby corrected as shown below:

SHEET NO. 9 of 20:
Figure 10, "[PROPERTY" should read --[PROPERTY]--.

COLUMN 2:
Line 49, "control" should read --controlling--.
Line 67, "control" should read --controlling--.

COLUMN 5:
Line 48, "temporarily" should read --temporarily stores--.

COLUMN 7:
Line 20, "has" should read --have--.
Line 43, "forth" should read --fourth--.
Line 52, "causes" should read --is caused--.

COLUMN 8:
Line 1, "causes" should read --is caused--.

COLUMN 13:
Line 47, "forth" should read --fourth--.

COLUMN 14:
Line 11, "corresponds" should read --correspond--.
Line 12, "is" should read --are--.
Line 26, "moved" should read --moves--.

UNITED STATES PATENT AND TRADEMARK OFFICE
CERTIFICATE OF CORRECTION

PATENT NO. : 7,050,186 B1
APPLICATION NO. : 09/557913
DATED : May 23, 2006
INVENTOR(S) : Noda It is certified that error appears in the above-identified patent and that said Letters Patent is hereby corrected as shown below:

COLUMN 14 (continued):
Line 37, "recovers" should read --and recovers--.
Line 39, "direction." should read --directions.--.

Signed and Sealed this

Twenty Second Day of April, 2008

JON W. DUDAS
*Director of the United States Patent and Trademark Office*